July 4, 1967
H. GROOT
3,329,896
A.C. METER HAVING TEMPERATURE COMPENSATED
RECTIFIERS BIASED FOR LINEAR OPERATION
Filed July 30, 1964
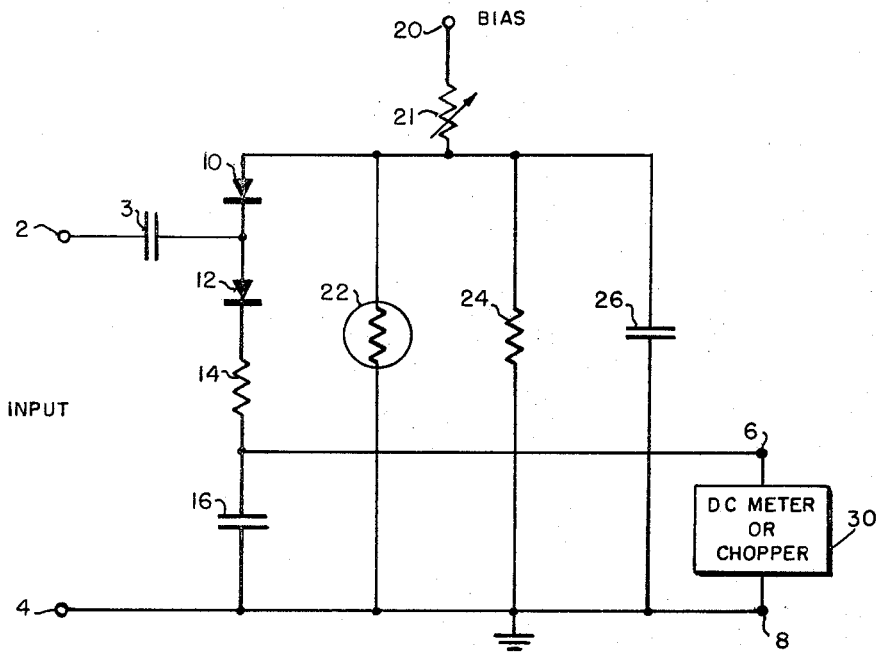
INVENTOR,
HENDRIK GROOT.
BY: Harry M. Saragovitz,
Edward J. Kelly,
Herbert Berl &
Julian C. Keppler
ATTORNEYs

3,329,896
A.C. METER HAVING TEMPERATURE COMPENSATED RECTIFIERS BIASED FOR LINEAR OPERATION
Hendrik Groot, Magnolia, N.J., assignor to the United States of America as represented by the Secretary of the Army
Filed July 30, 1964, Ser. No. 386,457
2 Claims. (Cl. 324—119)

ABSTRACT OF THE DISCLOSURE

An alternating-current measuring device using a direct-current meter with diode rectifiers for converting the alternating-current to direct-current; a biasing voltage across the diode rectifiers to maintain them in a linear portion of their operating range; and a temperature compensating network in parallel with the diode rectifiers to correct for the variation in the resistance of the diodes with respect to temperature.

---

This invention relates to probes and particularly to low-voltage, alternating-current probes. More particularly, this invention relates to temperature-compensated, low-voltage, alternating-current probes using diode detectors and direct-current indicating devices.

Alternating-current probes are well known, and the use of diodes to translate the alternating current to a direct current to be applied to a standard, direct-current, indicating device is basic. However, diodes do not have a linear, voltage-current relationship below a certain, substantial voltage and they are unusable for even slight, negative variations, which may occur in certain, direct-current usage of a meter. Furthermore, the voltage-current relationship of diodes is not constant with respect to temperature, and becomes inaccurate, if not unreliable, at temperatures not too far above or below room temperature.

It is therefore an object of this invention to provide an improved, diode, voltage-sensitive probe having linear characateristics in the zero voltage range.

It is a further object of this invention to provide an improved, voltage-sensitive, alternating-current probe using diode detectors that are accurate over a wide range of temperatures.

These and other objects are accomplished by applying a bias voltage, with a temperature-compensating network, across the series-connected diodes in a standard probe, to raise the minimum voltage across the diodes above the non-linear voltage range of the diodes. Any alternating voltage applied to the probe will be rectified by the diodes and will add to the constant bias voltage to produce a linear change in the associated, direct-current meter—which can be calibrated or compensated with respect to the constant bias violtage.

The temperature-compensating network maintains the bias voltage at a constant level across the direct-current meter over a substantial temperature range, by compensating for the variation in the diode, voltage characteristics with respect to temperature over that temperature range.

This invention will be better understood and other objects of this invention will become more apparent from the following specification and the drawing which shows the circuit diagram of a typical embodiment of this invention.

Referring now to the drawing, the input terminal 2 is connected through a direct-current-decoupling capacitor 3 to the junction of the two diodes. The other input terminal 4 is connected to ground. The output terminals 6 and 8 are connected across the filter capacitor 16, and terminal 8 is also grounded.

A source of bias voltage 20 connects through the variable resistor 21, and through the series combination of the diodes 10 and 12, the resistor 14, and the DC meter or chopper 30 to ground. The variable resistor 21 also connects to ground through the thermistor 22, and through the resistor 24, both of which bypass the series combination including the diodes and the DC meter.

The additional capacitor 26 connects between the diode 10 and ground, and forms, with the other capacitor 16 and the two diodes 10 and 12, a basic, voltage-doubler circuit for converting an alternating current input into a measurable, direct-current output through the meter.

In operation the bias voltage at 20 applies an initial constant voltage across the series combination of the diodes and the DC meter or chopper. The voltage across the diodes is chosen to be above the minimum voltage that will maintain the diodes above the non-linear range of their voltage-current characteristics in the neighborhood of zero volts. However, the voltage across the diodes varies with temperature, particularly at the extreme ranges of possible temperatures, while the voltage across the meter does not vary significantly with temperature. This would lead to erroneous changes in meter readings with respect to temperature.

These errors are compensated by the parallel connection of the thermistor 22, which also varies with respect to temperature, and a portion of the diode network. The change in the voltage-current relationship of the diode with respect to temperature is counterbalanced by the change in the voltage-current relationship across the thermistor to maintain the voltage across, and the current through, the DC meter substantially constant over a wide range of temperatures.

This condition of the meter is constant with no incoming AC signal applied to the diodes. The meter may be calibrated, or set to zero, under this condition.

The resistor 24 is also across the thermistor 22 and varies its effectiveness in a well known manner to provide the correct amount of compensation for any given diodes over the probable variation in ambient temperature. Once the resistor 24 is adjusted, the compensation remains accurate for almost all samples of diodes of a given type.

The voltage-doubler circuit converts the alternating current input into a filtered, direct current that is proportional to the alternating current. This direct current can be measured and indicated by the DC meter, or can be used to control a chopper circuit of any type well known in the art.

The resistor 21 is made variable to adjust the initial bias voltage across the circuit to the calibration point of the DC meter. This variable resistor 21 provides a ready means to recalibrate the meter to correct for slight variations in the different samples of diodes that might be used.

This circuit is particularly suitable for point contact diodes, and the parameters of the circuit will normally be set up for the characteristics of the average samples of a specific type of diode, although, almost any combination of diodes can be used and they need not be matched pairs In a typical embodiment of this invention, the diode 10 and 12 are of the type IN830, manufactured by Sylvania; the capacitors 16, 26, and 3 are all .1 microfarad the resistors 14, 21, and 24 are 6.8, 5 and 1 thousand ohms respectively; and the thermistor 22 is 100 ohms at 37.8 degrees centigrade.

What is claimed is:
1. An alternating-current probe comprising:
   a first and a second rectifying means connected in series;

a direct-current indicating means connected in series with said first and second rectifying means;

a direct-current biasing means;

means for connecting said direct-current biasing means across said series combination of said first and second rectifying means and said direct-current indicating means;

a first capacitive means connected across said series combination of said first and second rectifying means and said direct-current indicating means;

a second capacitive means connected across said direct-current indicating means;

temperature-compensating resistive means connected across said series combination of said first and second rectifying means and said direct-current indicating means;

and means for connecting a source of input signals across the series connection of the second rectifying means and said direct-current indicating means.

2. An alternating-current probe comprising:

a source of bias voltage;

a first resistor;

first and second diodes connected in series;

a second resistor;

a direct-current indicating meter;

said first resistor, said series combination of said first and second diodes, said second resistor, and said direct-current indicating meter connected in series across said source of bias voltage;

a thermistor connected across the series combination of said first and second diodes, said second resistor, and said direct-current indicating meter;

a third resistor connected in parallel with said thermistor;

a first capacitor connected in parallel with said direct-current indicating meter;

a second capacitor connected in parallel with said thermistor;

and a third capacitor connected in series with a source of input signals between the junction of said first and second diodes and one of the terminals of said source of bias voltage.

References Cited
UNITED STATES PATENTS 2,425,987  8/1947  Boykin _____ 324—72.5 X
3,207,984  9/1965  Tolliver _____ 324—106 X RUDOLPH V. ROLINEC, *Primary Examiner.*

WALTER L. CARLSON, *Examiner.*

J. MULROONEY, *Assistant Examiner.*